Jan. 11, 1938.   C. R. PATON   2,105,369
MOTOR VEHICLE
Filed Nov. 27, 1934   2 Sheets-Sheet 1
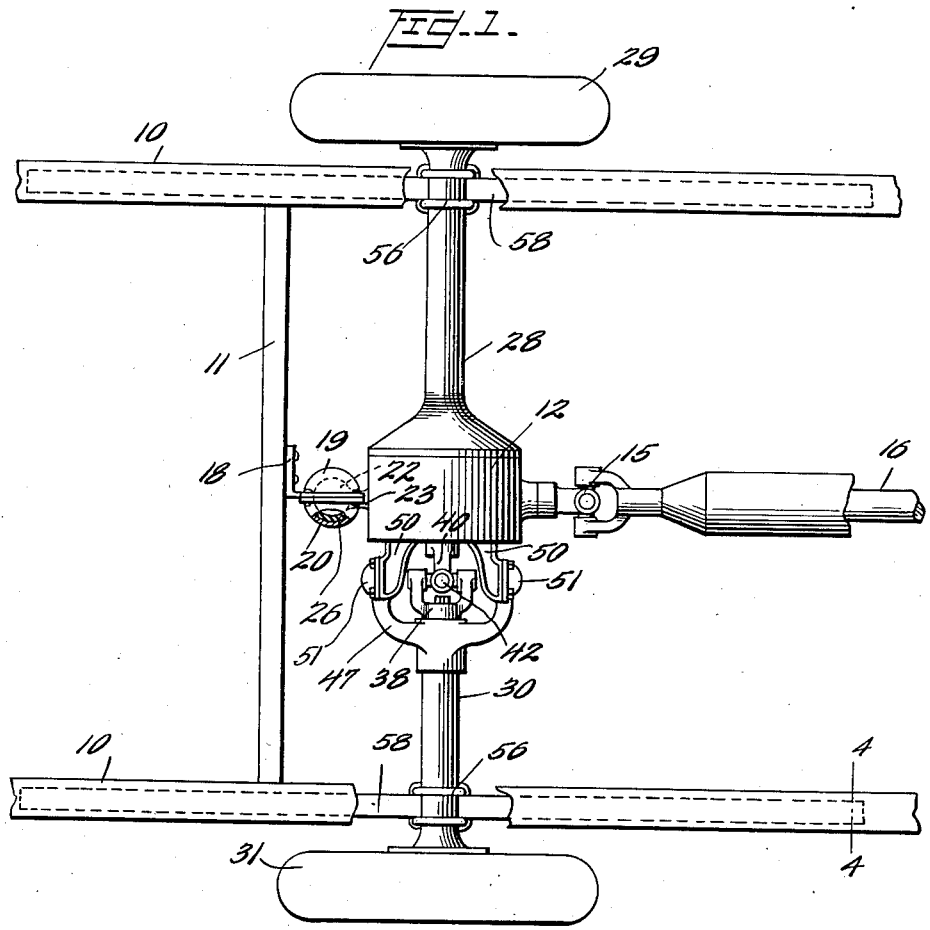
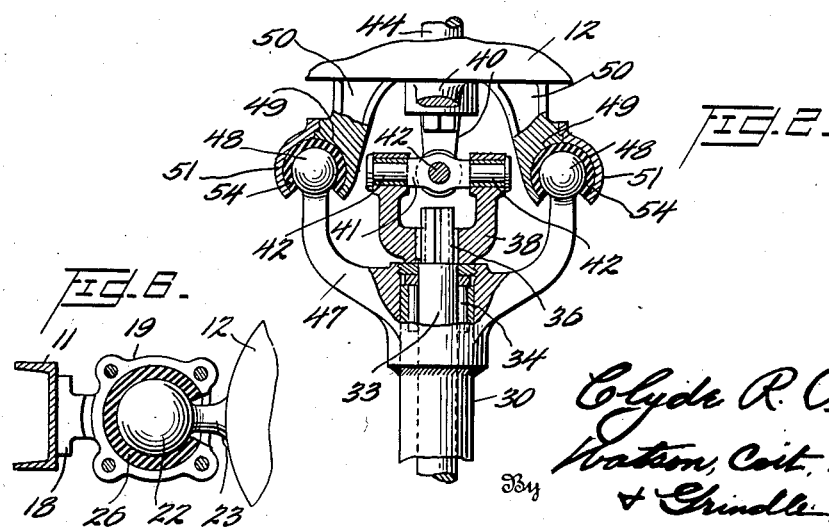

Jan. 11, 1938.  C. R. PATON  2,105,369
MOTOR VEHICLE
Filed Nov. 27, 1934  2 Sheets-Sheet 2
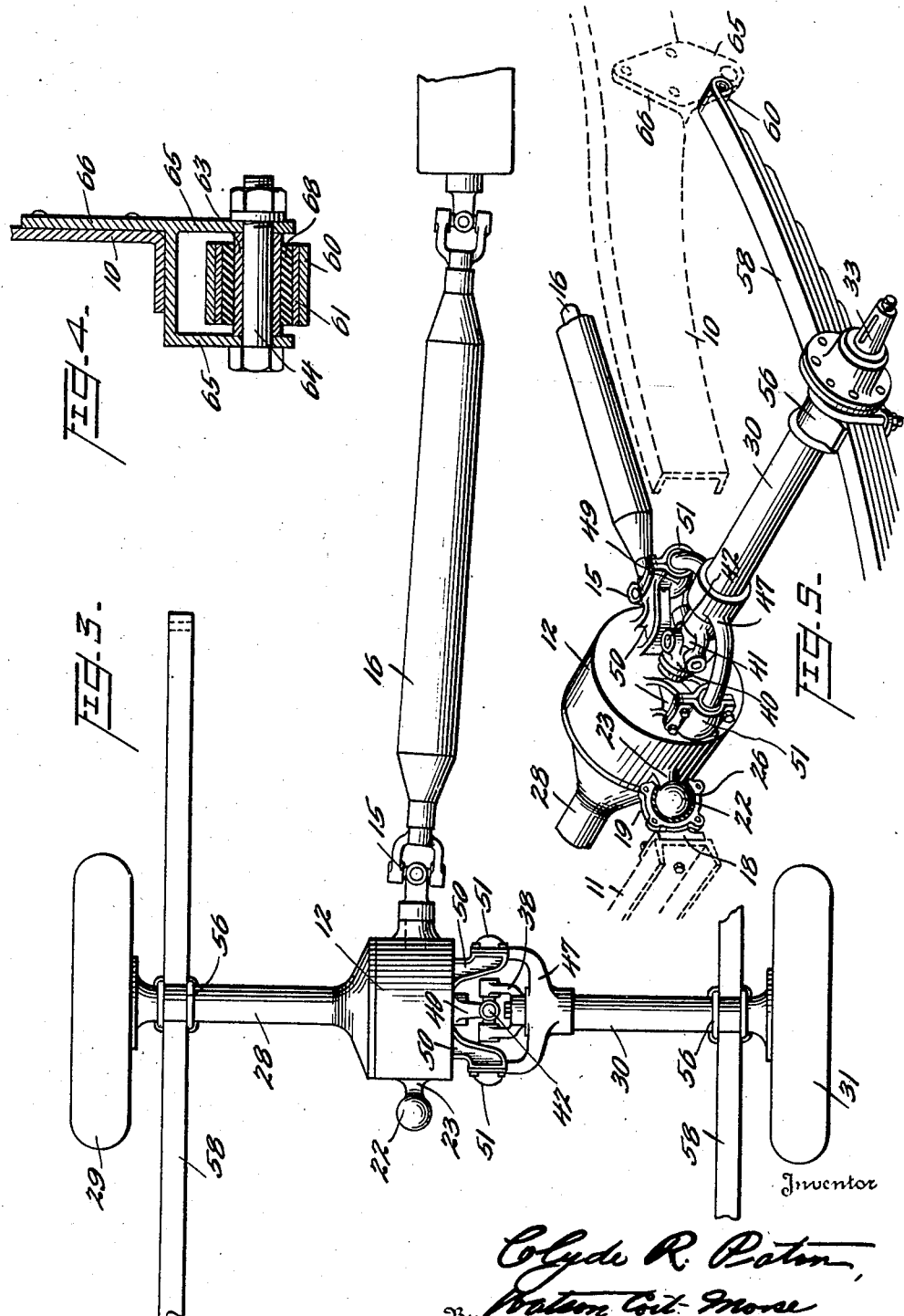
Inventor
Clyde R. Paton
By Barton, Coit, Morse
 + Grindle
Attorney Patented Jan. 11, 1938

2,105,369

UNITED STATES PATENT OFFICE 2,105,369

MOTOR VEHICLE

Clyde R. Paton, Birmingham, Mich., assignor to Packard Motor Car Company, Detroit, Mich., a corporation of Michigan Application November 27, 1934, Serial No. 755,053

10 Claims. (Cl. 180—73)

This invention relates to motor vehicles and more particularly to drive systems and wheel suspensions for motor vehicles. It is the principal object of the invention to improve the riding qualities of the vehicle and to increase the smoothness of operation of the drive system, undesirable vibration being reduced to a minimum.

While some features of the invention are applicable to the suspension of vehicle road wheels other than the driving wheels, the invention is of particular importance when applied to the driving road wheels and is so illustrated in the preferred embodiment shown in the accompanying drawings and described specifically herein. Thus it is a feature of the invention that the wheel suspension is so combined with the usual differential housing as to necessitate the employment of only one universal joint intermediate the differential gearing and the road wheels, the differential housing and associated gearing partaking of movement with one of the driving axles during rising and falling movement of the wheel. In other words, the arrangement may be such that the wheel suspension is formed in two units, one unit being comprised by a driving axle and the differential housing, supported for pivotal movement on the vehicle frame, the other unit comprising the other driving axle which is pivotally supported on the first unit. Preferably a cushioning medium, such as rubber, is interposed between these units and between the frame and all of the elements of the wheel suspension to prevent transmission of shock and to damp vibration.

It is a further object of the invention to provide a construction of this character in which the torque applied to the differential housing by the drive system is distributed substantially equally between the vehicle springs at opposite sides of the vehicle.

In one embodiment of the invention the construction is such that the road wheels at opposite sides of the frame execute rising and falling movement through arcs of substantially equal radii, the point of pivotal support of the two axle units being located at opposite sides of the center line of the vehicle and preferably equidistant therefrom.

Further objects and features of the invention will be apparent from the following description taken in connection with the accompanying drawings, in which Figure 1 is a plan view of a portion of a vehicle chassis illustrating one embodiment of the present invention;

Figure 2 is an enlarged view partly in section of a portion of the structure shown in Figure 1;

Figure 3 is a view corresponding to Figure 1 but illustrating a modified form of the invention;

Figure 4 is a section on line 4—4 of Figure 1;

Figure 5 is a perspective view of the structure illustrated in Figure 1; and

Figure 6 is a vertical section of a detail shown in Figure 1.

In order to facilitate an understanding of the invention, reference is made to the embodiments thereof illustrated in the acompanying drawings and specific language is employed to describe the same. It will nevertheless be understood that by the use of such detailed descriptive language no limitation of the scope of the invention is intended and that various further modifications and alterations are contemplated.

Referring now to Figure 1 of the drawings, it will be observed that the side rails of the vehicle frame are shown at 10 and are bridged by a cross frame member 11 secured at its opposite ends to the side rails. The differential housing 12 encloses the usual differential gearing, not shown, which is driven through a universal joint 15 by a drive shaft 16 which may form part of the conventional Hotchkiss type of drive, employing a relatively long drive shaft with a universal joint connection at both the forward and rearward ends thereof.

In one embodiment of the invention the differential housing 12 is pivoted to the vehicle frame at the rear side thereof, for instance by means of a bracket 18 secured to the cross frame member 11, the bracket 18 being formed in two parts 19 and 20 which are bolted or otherwise secured together and which afford a generally spherical socket within which is received a spherical head 22 formed on a bracket 23 secured to or formed on the differential housing. A sheath 26 of rubber or similar deformable material is interposed between the head 22 and the socket portion of the bracket 18 and is preferably vulcanized to both. Thus the housing 12 may partake of limited universal rocking movement on the frame, any such movement effecting deformation of the rubber sheath 26. The rubber further serves to damp vibrations induced in the housing 12 and to prevent the transmission of such vibrations to the vehicle frame.

An axle housing 28 is secured to or formed on the differential housing 12, the outer end of this axle housing affording a support for the usual brake backing plate and other non-rotatable parts of the wheel assembly and carrying the road wheel 29, the latter being driven from the gearing within the housing 12 through a driving axle extending through the axle housing 28 in the conventional manner.

A second axle housing 30 affords a similar support for a road wheel 31 which is rotated by means of an axle 33 disposed within the axle housing 30 and suitably journalled therein as indicated at 34.

The axle 33 is provided at its inner end with a splined connection 36 or the equivalent thereof to one member 38 of a universal joint, this splined connection affording relative movement laterally of the frame between the axle 33 and the universal joint. This universal joint may be of any conventional type and is shown in the drawings as comprising a yoke-shaped member 40 complementary to the member 38, and an intermediate member 41, the latter being provided with a plurality of radially disposed arms 42 which are arranged at intervals of 90° and which are journalled in the yoke-shaped members 38 and 40 respectively. The member 40 is secured to or formed on a stub shaft 44 which projects laterally from the differential housing 12 and which is rotated by the gearing therein in the conventional manner.

The axle housing 30 is supported on the unit comprising the axle housing 28 and the differential housing 12 by means of a yoke-shaped member 47, the inwardly directed arms of this member being provided with substantially spherical head portions 48 which are received in the cup-shaped portions 49 of brackets 50, each of these cup-shaped portions having a removable part 51 which is bolted or otherwise secured in position so as to permit introduction of the head portions 48 of the member 47 in the generally spherical sockets thus formed. Sheaths of rubber or similar deformable material 54 are interposed between these cooperating portions of the member 47 and the brackets 50 and are preferably vulcanized to both. It will be observed that this construction provides for oscillatory movement of the axle housing 30 in a generally vertical transverse plane, such movement effecting deformation of the rubber sheaths 54 with resultant damping of vibration and cushioning of shock. It will also be appreciated that slight relative displacement of the differential housing 12 and the axle housing 30 laterally of the vehicle frame is permitted, the rubber sheaths 54 yielding to the extent necessary to accommodate such movement.

The axis of pivotal movement of the axle housing 30 passes through the center of the universal joint and thus as the road wheel 31 rises and falls, the driving connection between this wheel and the gearing within the differential housing is not interrupted. It will nevertheless be seen that, owing to the nature of the connection between the axle housing 30 and the differential housing 12, the usual torque applied to the differential housing will be distributed substantially equally between the axle housings 28 and 30. In other words, any tendency of the differential housing 12 to rotate in a generally vertical plane extending longitudinally of the vehicle will be communicated to the axle housing 30 as well as to the axle housing 28.

Adjacent the outer ends thereof each axle housing is secured, for instance as indicated at 56, to a longitudinally extending leaf spring 58. Each of these leaf springs is in turn supported on the frame through cushioning means as illustrated more particularly in Figure 4 of the drawings. Thus the usual spring eye 60 is shown as receiving a bushing 61, and a bushing 63 of less diameter is supported on a bolt 64 which extends through openings in the arms 65 of a bracket 66, the latter being secured to the adjacent side rail 10. Interposed between the bushings 61 and 63 is a sheath of rubber or similar deformable material 68 which is preferably vulcanized or surface bonded to both bushings.

The nature of operation of the suspension will be readily understood from the foregoing description. As either road wheel rises and falls, the associated leaf spring will be flexed. The normal tendency of the spring to remain in one vertical longitudinally directed plane during flexure may necessitate some bodily outward displacement of either axle unit as the associated wheel rises. In the case of the axle housing 28, lateral play is provided by the mounting of the differential housing 12 on the bracket 18, the rubber sheath 26 yielding to a sufficient extent to prevent the application of undue stress to the vehicle spring. The driving axle within the housing 28 and the associated gearing within the housing 12 move as a unit with the road wheel and the axle housing. On rising movement of the road wheel 31, lateral displacement of the axle 33 is permitted at the splined connection 36 and lateral movement of the axle housing 30 is possible by reason of the nature of the connection between this housing and the differential housing 12, the rubber sheaths 54 being compressed to afford such movement.

When the Hotchkiss type of drive is employed, angular displacement of the drive shaft is accompanied by slight rotational movement thereof, by reason of the action of the universal joints at the ends of the drive shaft. This slight rotational movement frequently results in the setting up of undesirable vibration which may be readily absorbed in the present construction by reason of the flexible mounting of the differential housing, the latter rocking to accommodate any such rotational movement and the vibrational disturbances being damped in the rubber which affords the support for the housing. Similarly, clutch chatter which is the result of sudden application of torque to the system may be effectively absorbed in the mounting for the differential housing, and no vibrations are transmitted to the frame through the springs by reason of the rubber elements including in the spring mountings. Transmission of vibration between the two axle units is also prevented by the employment of the rubber connection therebetween.

Referring now to the form of the invention shown in Figure 3 of the drawings, it will be observed that this is similar so far as the various elements are concerned to that hereinbefore described, and similar characters of reference have accordingly been applied. However, the differential housing 12 is supported on the frame laterally of the center line of the vehicle, and the point of pivotal connection for the other axle unit is preferably disposed at the same distance on the opposite side of the vehicle center line. Thus the two axle units may be permitted to partake of identical movement, the road wheels executing arcs of movement of equal radii. By means of this construction uneven wear on the tires can be avoided and smoother action is obtained since the effective length of the axle housing 30 may be thereby increase. Excessive change in camber of the wheel 31 as the latter rises and falls is thus avoided and the angular displacement of the pivotal connections between the two units is decreased.

Having thus described the invention, what is claimed as new and desired to be secured by Letters Patent is:

1. In a motor vehicle, the combination with a vehicle frame, of road wheels disposed at opposite sides of said frame, axle units supporting the respective road wheels, means for pivotally supporting one of said axle units on said frame about an axis extending generally longitudinally of said frame and spaced laterally of the center line of the frame, means for pivotally supporting the other of said axle units on said first axle unit about an axis extending generally longitudinally of the frame and spaced laterally of the center line of the frame on the opposite side thereof from said first named axis, said axes being substantially equidistant from said center line, whereby each wheel will move through an arc of substantially the same radius in rising and falling, and yielding means acting between said frame and said units for resisting relative upward displacement of the latter.

2. In a motor vehicle, the combination with a frame, of a differential housing carried by said frame, axle units associated with said differential housing and supported for generally vertical swinging movement, one of said units having a yoke portion comprising laterally extending arms, each of said arms having pivotal connection with said differential housing, the other of said units being rigid with said differential housing, means pivotally supporting said differential housing and the unit rigid therewith on said frame, and yielding means acting between said frame and said units for resisting relative upward displacement of the latter.

3. In a motor vehicle, the combination with a frame, of a differential housing carried by said frame, axle units associated with said differential housing and supported for generally vertical swinging movement, one of said units having a yoke portion comprising laterally extending arms, each of said arms having pivotal connection with said differential housing, said pivotal connections including rubber elements interposed between and surface bonded to said arms and said housing and deformable in response to relative movement thereof, the other of said units being rigid with said differential housing, means pivotally supporting said differential housing and the unit rigid therewith on said frame, and yielding means acting between said frame and said units for resisting relative upward displacement of the latter.

4. In a motor vehicle, the combination with a frame, of a differential housing carried by said frame, and axle units associated with said differential housing and supported for generally vertical swinging movement, one of said units comprising an axle housing having a yoke portion comprising laterally extending arms, each of said arms having pivotal connection with said differential housing in a common, generally horizontal plane, an axle supported in said axle housing, a universal joint connection disposed in the said plane and connecting said axle with gearing contained in said differential housing, the other of said units being rigid with said differential housing, means pivotally supporting said differential housing and the unit rigid therewith on said frame, and yielding means acting between said frame and said units for resisting relative upward displacement of the latter.

5. In a motor vehicle, the combination with a frame, of a differential housing pivoted on said frame, axle units associated with said differential housing and supported for generally vertical swinging movement, one of said units having a yoke portion comprising laterally extending arms, each of said arms having pivotal connection with said differential housing, the other of said units being carried by and movable with said differential housing, and yielding means acting between said frame and said units for resisting relative upward displacement of the latter.

6. In a motor vehicle, the combination with a vehicle frame, a wheel supporting unit pivoted on said frame for swinging movement in a generally vertical transverse plane, a second wheel supporting unit pivoted on said first unit for independent swinging movement in a generally vertical transverse plane, means including rubber interposed between and affording the pivotal connection between said units, longitudinally extending leaf springs carrying said units adjacent the outer ends thereof, means including rubber supporting said springs on said frame, and means including rubber interposed between and affording the pivotal connection between one of said units and said frame, the axes of pivotal connection between said first named unit and said frame, and between said units, being generally parallel to and disposed on opposite sides of the center line of the frame.

7. In a motor vehicle, the combination with a frame, of a differential housing pivoted on said frame for movement about a generally horizontal axis, axle units, each comprising an axle housing and a driving axle, associated with said differential housing, longitudinally extending leaf springs supporting said units on said frame, the axle housing of one of said units having a pivotal connection with said differential housing comprising cooperating elements having rubber interposed therebetween, said rubber distorting to permit slight relative displacement of said elements in a direction transverse to said frame, the axle housing of the other of said units being rigid with said differential housing.

8. In a motor vehicle, the combination with a frame, of a differential housing pivoted on said frame for movement about a generally horizontal axis, axle units, each comprising an axle housing and a driving axle, associated with said differential housing, longitudinally extending leaf springs supporting said units on said frame, the axle housing of one of said units having a pivotal connection with said differential housing comprising cooperating elements partaking of slight relative displacement in a direction transverse to said frame, the other of said units having the axle housing thereof rigid with said differential housing, said pivotal connection between said differential housing and said frame comprising cooperating elements partaking of slight relative displacement in a direction transverse to said frame.

9. In a motor vehicle, the combination with a vehicle frame, of a differential housing pivotally supported on said frame, an axle assembly extending laterally of said frame and connected with the differential housing for swinging movement therewith in a generally vertical transverse plane, a second axle assembly pivotally connected to said first axle assembly for swinging movement in a generally vertical transverse plane substantially coincident with said first named plane, said pivotal connection between said axle assemblies effecting torque connection therebetween about a transverse axis, and leaf springs carrying the respective axle assemblies and resisting driving torque applied to said differential housing.

10. In a motor vehicle, the combination with a vehicle frame, of road wheels disposed at opposite sides of said frame, axle units supporting the respective road wheels, means for pivotally supporting one of said axle units on said frame about an axis extending generally longitudinally of said frame and spaced laterally of the center line of the frame, means for pivotally supporting the other of said axle units on said first axle unit about an axis extending generally longitudinally of the frame and spaced laterally of the center line of the frame on the opposite side thereof from said first named axis, the axis of each unit being disposed on the same side of the center line as the road wheel associated with that unit, said axes being substantially equidistant from said center line, whereby each wheel will move through an arc of substantially the same radius in rising and falling, and yielding means acting between said frame and said units for resisting relative upward displacement of the latter.

CLYDE R. PATON.